US006912207B2

(12) United States Patent
Ohnishi et al.

(10) Patent No.: US 6,912,207 B2
(45) Date of Patent: Jun. 28, 2005

(54) NETWORK TOPOLOGY DESIGN APPARATUS AND NETWORK TOPOLOGY DESIGN METHOD, AND RECORDING MEDIUM RECORDED WITH A NETWORK TOPOLOGY DESIGN PROGRAM

(75) Inventors: Makoto Ohnishi, Chiyoda (JP); Wataru Funakoshi, Chiyoda (JP); Masanori Ozawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 727 days.

(21) Appl. No.: 09/725,469

(22) Filed: Nov. 30, 2000

(65) Prior Publication Data

US 2003/0145110 A1 Jul. 31, 2003

Related U.S. Application Data

(63) Continuation of application No. PCT/JP99/01029, filed on Mar. 3, 1999.

(30) Foreign Application Priority Data

Jun. 2, 1998 (JP) ........................................... 10-152450

(51) Int. Cl.[7] .............................................. H04L 12/28
(52) U.S. Cl. ...................................... 370/255; 703/13
(58) Field of Search ................................ 370/254, 238, 370/252, 253, 255–258, 400, 328, 386, 464–465; 709/220, 222, 200; 703/1, 2, 13

(56) References Cited

U.S. PATENT DOCUMENTS

| 5,598,532 A | * | 1/1997 | Liron ............................. 703/2 |
| 5,854,903 A | * | 12/1998 | Morrison et al. ........... 709/249 |
| 5,867,397 A | * | 2/1999 | Koza et al. .................... 703/14 |
| 6,349,090 B1 | * | 2/2002 | Lewis et al. ................ 370/238 |
| 6,374,202 B1 | * | 4/2002 | Robinson ...................... 703/13 |
| 2003/0048749 A1 | * | 3/2003 | Stamatelakis et al. ...... 370/225 |

OTHER PUBLICATIONS

Y. Tanaka et al., "Application of Genetic Algorithms to VOD Network Topology Optimization", IEICE Transactions on Communications, vol. E79–B, No. 8, p. 1046–1053, Aug. 1996.
G. Celli et al., "Genetic Algorithms for Telecommunication Network Optimization", Proceedings of IEEE International Conference on Systems, Man and Cybernetics, 1995, vol. 2, p. 1227–1232.
N. Shimamoto et al., Network Design Using Genetic Algorithm, Electronic Information Communication Academy Technical Research Report, vol. 91, No. 455 (SSE 91–132), p. 55–60, 1992.
Office Action (Notice of Reasons for Rejection) from corresponding Japanese application 10–152450.
B.M. Kim, "A Study On The Convergence of Genetic Algorithms", Computers & Industrial Engineering, USA, Pergamon, Dec. 1997, vol. 33, Nos. 3–4, pp. 581–588.

* cited by examiner

*Primary Examiner*—Ricky Ngo
*Assistant Examiner*—Jason Mattis
(74) *Attorney, Agent, or Firm*—Staas & Halsey LLP

(57) ABSTRACT

In a network topology design apparatus for designing a network topology connecting a plurality of points by communication lines so that a predetermined traffic volume is transmitted between the plurality of points, chromosomes wherein the network topology is represented in a matrix are created, and a genetic algorithm is applied to evolve the chromosomes in order to improve cost performance. Then by applying a local search method to the chromosomes which have been evolved by the genetic algorithm, to search the chromosomes in the neighborhood of the evolved chromosomes, a chromosome with a better cost performance is determined. In this way, genetic algorithms and local search methods are applied to design a network topology with excellent cost performance.

10 Claims, 13 Drawing Sheets

| j\i | 1 | 2 | 3 | 4 | 5 |
|---|---|---|---|---|---|
| 1 | | 0 | 1 | 0 | 0 |
| 2 | | | 0 | 1 | 0 |
| 3 | | | | 1 | 0 |
| 4 | | | | | 1 |
| 5 | | | | | |

FIG.4

TRAFFIC VOLUME

|  | AOMORI | KANAZAWA | TOKYO | OSAKA | YAMAGUCHI |
|---|---|---|---|---|---|
| AOMORI |  | 10 | 71 | 33 | 16 |
| KANAZAWA | 9 |  | 82 | 24 | 17 |
| TOKYO | 70 | 83 |  | 155 | 58 |
| OSAKA | 32 | 24 | 153 |  | 79 |
| YAMAGUCHI | 15 | 16 | 56 | 76 |  |

(kbps)

FIG.5A

CHARGE TABLE (64kbps)

|  | AOMORI | KANAZAWA | TOKYO | OSAKA | YAMAGUCHI |
|---|---|---|---|---|---|
| AOMORI |  | 1846 | 1829 | 2050 | 2322 |
| KANAZAWA |  |  | 1591 | 1540 | 1846 |
| TOKYO |  |  |  | 1693 | 2033 |
| OSAKA |  |  |  |  | 1693 |
| YAMAGUCHI |  |  |  |  |  |

(100 YEN)

FIG.5B

CHARGE TABLE (128kbps)

|  | AOMORI | KANAZAWA | TOKYO | OSAKA | YAMAGUCHI |
|---|---|---|---|---|---|
| AOMORI |  | 2564 | 2531 | 2960 | 3488 |
| KANAZAWA |  |  | 2069 | 1970 | 2564 |
| TOKYO |  |  |  | 2267 | 2927 |
| OSAKA |  |  |  |  | 2267 |
| YAMAGUCHI |  |  |  |  |  |

(100 YEN)

NETWORK TOPOLOGY DESIGN APPARATUS AND NETWORK TOPOLOGY DESIGN METHOD, AND RECORDING MEDIUM RECORDED WITH A NETWORK TOPOLOGY DESIGN PROGRAM

This application is a continuation of PCT/JP99/01029 filed Mar. 3, 1999.

TECHNICAL FIELD

The present invention is related to a technique for designing a network topology, so that cost performance is optimized under predetermined conditions, when constructing a network connecting a plurality of points by communication lines.

BACKGROUND ART

With the large scale and complexity of recent networks, in enterprises and the like, the necessity to construct networks such as LAN (Local Area Network)/WAN (Wide Area Network) and the like as economically as possible has increased. Especially recently, as various connection services have been provided, it has become necessary to construct economical and effective networks according to a company's needs by combining these connection services appropriately.

However, in many actual situations, network designers mainly analyze network traffic based on their personal experiences and simple calculations to determine network topology. Therefore, network cost performance is not always the best, and hence the situation is that economical network construction is difficult.

Accordingly, the present invention takes into consideration the above heretofore problem, with the object of providing a technique wherein an optimization problem of network topology is formulated, and genetic algorithms and local search methods are used so that networks with excellent cost performance can be constructed.

DISCLOSURE OF THE INVENTION

To achieve the abovementioned object, as a first aspect of the present invention, there is provided a network topology design apparatus for designing a network topology connecting a plurality of points by communication lines by adopting a genetic algorithm so that a predetermined traffic volume can be transmitted between the plurality of points, comprising: chromosome creation means for randomly creating a predetermined number of initial generation chromosomes representing the network topology in a matrix; communication path determination means for determining a communication path between the respective points by applying the solution of a shortest path problem to each network topology represented by the chromosome; line capacity determination means for, based on the communication path determined by the communication path determination means and the predetermined traffic volume, determining the capacity of each communication line connecting the points; fitness calculation means for, based on the capacity of each communication line determined by the line capacity determination means, computing fitness that is inversely proportional to communication cost; chromosome evolution means for, based on the fitness computed by the fitness computing means, evolving sequentially the predetermined number of chromosomes to the next generation chromosomes; generation judgment means for judging whether or not the generation of the chromosome evolved by the chromosome evolution means has reached a predetermined generation; and first control means for, when it is judged by the generation judgment means that the generation has not yet reached the predetermined generation, repeating the processing of the communication path determination means and the subsequent means, and when judged that the generation has reached the predetermined generation, for outputting the chromosome with the highest fitness among the predetermined number of chromosomes.

With such a construction, the network topology with excellent cost performance is designed by the following processes.

(1) A predetermined number of initial generation chromosomes are created by the chromosome creation means.

(2) A communication path between the respective points is determined by the communication path determination means for each network topology represented by chromosomes.

(3) The capacity of the communication line between the respective points is determined by the line capacity determination means based on the communication path.

(4) Fitness that is inversely proportional to communication cost is computed by the fitness computing means based on the capacity of the communication fine.

(5) The chromosome is evolved to the next generation chromosome by the generation judgment means based on the fitness.

(6) It is judged by the generation judgment means whether or not the generation of the evolved chromosome has reached a predetermined generation.

(7) When it is judged by the first control means that the generation of the chromosome has not reached the predetermined generations the processing of the communication path determination means and the subsequent means are repeated. On the other hand, when it is judged that the generation of the chromosome has reached the predetermined generation, the chromosome with the highest fitness among the predetermined number of chromosomes is output.

That is to say, until the generation of the chromosome reaches the predetermined generation, process stages (2) through (5) are repeated, and the chromosome is gradually evolved. At this time, the chromosome is evolved by the chromosome evolution means to inherit characteristics of the chromosome.

Furthermore, when designing a network topology, a two stage construction is used in which the communication path is considered (process stage (2)), and capacity of the communication line and fitness are computed (process stages (3) and (4)). Therefore, the solution space of the network topology can be drastically decreased. For example, in the case where a network topology connecting between n points by m kinds of communication lines is considered, the size of the solution space is "$(m+1)^{n(n-1)/2}$". However, by having a two stage construction like the present invention, the size of the solution space becomes "$2^{n(n-1)/2}$". Consequently, it is possible to design a network topology with excellent cost performance when using an electronic computer with a typical computing speed for the same period of time.

Moreover, the chromosome evolution means may include: extraction means for extracting two chromosomes from among the predetermined number of chromosomes corresponding to the fitness; chromosome division means for dividing the points into two groups with respect to each chromosome extracted by the extraction means; and first evolution means for inheriting the connection mode inside the group divided by the chromosome division means from one chromosome and for evolving the connection mode between the groups to the next generation chromosome inherited from the other chromosome.

With such a construction, two chromosomes are extracted by the extraction means from among the predetermined number of chromosomes corresponding to the fitness. The points are divided into two groups by the chromosome division means with respect to the extracted chromosomes. The next generation chromosome in which the connection mode inside the group is inherited from one chromosome and the connection mode between groups is inherited from the other chromosome is created. That is to say, a chromosome with high fitness, in other words, with low communication cost is extracted preferentially, so that the next generation chromosome inheriting excellent characteristics is created.

Furthermore, the chromosome evolution means may include: mutation determination means for determining individually on each of the predetermined number of chromosomes using a predetermined probability set in advance as to whether or not mutation is to be performed; and second evolution means for mutating an element randomly selected from among the elements of a matrix comprising the chromosome on which mutation is determined to be performed by the mutation determination means and for evolving to the next generation chromosome.

With such a construction, it is determined by the mutation determination means whether or not mutation is performed on all of the predetermined number of chromosomes by the predetermined probability set in advance. Then, an element randomly selected from among the elements of a matrix comprising the chromosome on which mutation has been determined to be performed is mutated to create the next generation chromosome. That is to say, by mutating a chromosome, chromosomes have variance and hence it is expected that a wider space of the solution will be searched.

Other than this, the construction may be such that there is provided usage rate limit input means for inputting a usage rate limit of the communication lines connecting between the points, and the line capacity determination means determines the capacity of the communication lines connecting between the points such that the usage rate of the communication lines is less than or equal to the usage rate limit input by the usage rate limit input means.

With such a construction, when the capacity of the communication lines is determined by the line capacity determination means, the capacity of the communication lines is determined such that the usage rate of the communication lines is less than or equal to the usage rate limit input by the usage rate limit input means. Consequently, it is possible to design a network topology in consideration of the network construction with a margin, or with future expandability and the like.

Furthermore, the construction may be such that there is provided evolution inhibiting means for inhibiting the evolution of a predetermined element among the elements of a matrix comprising the chromosome.

With such a construction, among the elements of a matrix comprising the chromosome, the evolution of a predetermined element is inhibited by the evolution inhibiting means. Consequently, for example, even when there is a requirement from a user "to connect a point i and a point j", or "to not connect the point j and a point k", it is possible to design a network topology that meets such a requirement.

Moreover, the construction may be such that there is provided chromosome search means for searching a chromosome with higher fitness by repeated search of chromosomes in the neighborhood of the chromosome output by the first control means, by applying a local search method.

With such a construction, chromosomes in the neighborhood of the chromosome output by the first control means are searched repeatedly by the chromosome search means, so that a chromosome with higher fitness is searched. That is to say, the final output chromosome is of higher fitness, in other words, has lower communication costs, so that the network topology has excellent cost performance.

As a second aspect of the present invention, there is provided a network topology design apparatus for designing a network topology connecting a plurality of points by communication lines by adopting a genetic algorithm so that a predetermined traffic volume can be transmitted among the plurality of points, comprising: chromosome evolution means for sequentially evolving a predetermined number of chromosomes representing the network topology in a matrix to the next generation chromosomes by adopting the genetic algorithm; uniformity computing means comparing each chromosome evolved to the next generation by the chromosome evolution means with the chromosome having the lowest communication cost of the same generation and for computing uniformity which is the rate at which the elements of the matrix comprising the chromosomes are matched; and second control means for, when the uniformity computed by the uniformity computing means is less than a predetermined value, evolving the chromosome to the next generation by the chromosome evolution means, and when the uniformity becomes greater than or equal to the predetermined value, outputting the chromosome having the lowest communication cost among the predetermined number of chromosomes.

With such a construction, each chromosome evolved by the chromosome evolution means is compared with the chromosome having the lowest communication cost of the same generation, and the uniformity is computed. Then, if the uniformity is less than the predetermined value, the chromosome is evolved to the next generation by the chromosome evolution means. On the other hand, if the uniformity is greater than or equal to the predetermined value, the chromosome having the lowest communication cost is output among the predetermined number of chromosomes. Furthermore, even when the generation of the chromosome does not reach a predetermined generation, if the uniformity becomes greater than or equal to the predetermined value, design processing of the network topology is terminated, and hence the design time is shortened.

As a third aspect of the present invention, there is provided a network topology design apparatus for designing a network topology connecting a plurality of points by communication lines by a genetic algorithm, comprising: traffic volume input means for inputting data regarding the traffic volume among the plurality of points; cost information input means for inputting data regarding the capacity and cost of the communication lines; and line capacity determination means for determining the capacity of the communication lines the respective points, based on data regarding the traffic volume among the plurality of points input by the traffic volume input means, and data regarding the capacity and cost of the communication lines input by the cost information input means.

With such a construction, data regarding the traffic volume among the plurality of points is input by the traffic volume means. Furthermore, data regarding the capacity and cost of the communication lines is input by the cost information input means. Then, based on the input data regarding the traffic volume and the input data regarding the capacity and cost of the communication lines, the capacity of the communication lines among the respective points is determined by the line capacity determination means. Consequently, a network topology with excellent cost performance is automatically designed.

As a fourth aspect of the present invention, there is provided a network topology design method of designing a network topology connecting a plurality of points by communication lines by adopting a genetic algorithm so that a predetermined traffic volume can be transmitted between the plurality of points, comprising: a chromosome creation step of randomly creating a predetermined number of initial generation chromosomes representing the network topology in a matrix; a communication path determination step of determining a communication path between the respective points by applying the solution of a shortest path problem to each network topology represented by the chromosome; a line capacity determination step of, based on the communication path determined by the communication path determination step and the predetermined traffic volume, determining the capacity of each communication line connecting the points; a fitness calculation step of, based on the capacity of each communication line determined by the line capacity determination step, computing fitness that is inversely proportional to communication cost; a chromosome evolution step of, based on the fitness computed by the fitness computing step, evolving sequentially the predetermined number of chromosomes to the next generation chromosomes; a generation judgment step of judging whether or not the generation of the chromosome evolved by the chromosome evolution step has reached a predetermined generation; and a control step of, when it is judged by the generation judgment step that the generation has not yet reached the predetermined generation, repeating the processing of the communication path determination step and the subsequent steps, and when judged that the generation has reached the predetermined generation, for outputting the chromosome with the highest fitness among the predetermined number of chromosomes.

With such a construction, the network topology with excellent cost performance is designed by the following processes.

(1) A predetermined number of initial generation chromosomes are created by the chromosome creation step.

(2) A communication path between the respective points is determined by the communication path determination step for each network topology represented by chromosomes.

(3) The capacity of the communication line between the respective points is determined by the line capacity determination step based on the communication path.

(4) Fitness that is inversely proportional to communication cost is computed by the fitness computing step based on the capacity of the communication line.

(5) The chromosome is evolved to the next generation chromosome by the generation judgment step based on the fitness.

(6) It is judged by the generation judgment step whether or not the generation of the evolved chromosome has reached a predetermined generation.

(7) When it is judged by the control step that the generation of the chromosome has not reached the predetermined generation, the processing of the communication path determination step and the subsequent steps are repeated. On the other hand, when it is judged that the generation of the chromosome has reached the predetermined generation, the chromosome with the highest fitness among the predetermined number of chromosomes is output.

That is to say, until the generation of the chromosome reaches the predetermined generation, process stages (2) through (5) are repeated, and the chromosome is gradually evolved. At this time, the chromosome is evolved by the chromosome evolution step to inherit characteristics of the chromosome.

Furthermore, when designing a network topology, a two stage construction is used in which the communication path is considered (process stage (2)), and capacity and fitness of the communication line are computed (process stages (3) and (4)). Therefore, the solution space of the network topology can be drastically decreased. For example, in the case where a network topology connecting between n points by m kinds of communication lines is considered, the size of the solution space is "$(m+1)^{n(n-1)/2}$". However, by having a two stage construction like the present invention, the size of the solution space becomes "$2^{n(n-1)/2}$". Consequently, it is possible to design a network topology with excellent cost performance when using an electronic computer with a typical computing speed for the same period of time.

As a fifth aspect of the present invention, there is provided a recording medium recorded with a network topology design program designing a network topology connecting a plurality of points by communication lines by adopting a genetic algorithm so that a predetermined traffic volume can be transmitted among the plurality of points, realizing: a chromosome creation function for randomly creating a predetermined number of initial generation chromosomes representing the network topology in a matrix; a communication path determination function for determining a communication path between the respective points by applying the solution of a shortest path problem to each network topology represented by the chromosome; a line capacity determination function for, based on the communication path determined by the communication path determination function and the predetermined traffic volume, determining the capacity of each communication line connecting the points; a fitness calculation function for, based on the capacity of each communication line determined by the line capacity determination function, computing fitness that is inversely proportional to communication cost; a chromosome evolution function for, based on the fitness computed by the fitness computing function, evolving sequentially the predetermined number of chromosomes to the next generation chromosomes; a generation judgment function for judging whether or not the generation of the chromosome evolved by the chromosome evolution function has reached a predetermined generation; and a control function for, when it is judged by the generation judgment function that the generation has not yet reached the predetermined generation, repeating the processing of the communication path determination function and the subsequent functions, and when judged that the generation has reached the predetermined generation, for outputting the chromosome with the highest fitness among the predetermined number of chromosomes.

Here, "recording medium" means any medium that allows reliable recording of electronic information and which also allows reliable search of the information as required; for example portable media such as magnetic tapes, magnetic disks, magnetic drums, IC cards and CD-ROMs.

With such a construction, a network topology design program is recorded on the recording medium for realizing:

a chromosome creation function, a communication path determination function, a line capacity determination function, a fitness computing function, a chromosome evolution function, a generation judgment function, and a control function. Consequently, with a recording medium on which such a program is recorded, a network topology design apparatus according to the present invention can be easily constructed using a typical electronic computer system.

As a sixth aspect of the present invention, there is provided recording medium recorded with a network topology design program for designing a network topology connecting a plurality of points by communication lines by a genetic algorithm, realizing: a traffic volume input function for inputting data regarding the traffic volume among the plurality of points; a cost information input function for inputting data regarding the capacity and cost of the communication lines; and a line capacity determination function for determining the capacity of the communication lines the respective points, based on data regarding the traffic volume among the plurality of points input by the traffic volume input function, and data regarding the capacity and cost of the communication lines input by the cost information input function.

With such a construction, a network topology design program is recorded on a recording medium for realizing: a traffic volume input function, a cost information input function, and a line capacity determination function. Consequently, with a recording medium on which such a program is recorded, a network topology design apparatus according to the present invention can be easily constructed using a typical electronic computer system.

BRIEF DESCRIPTION OF THE DRAWINGS

FIG. 4 is a diagram for explaining an example of traffic volume.

FIG. 5 is a diagram for explaining an example of communication charge tables;

FIG. 5A is a charge table when the capacity is 64 kbps;

FIG. 5B is a charge table when the capacity is 128 kbps.

BEST MODE FOR CARRYING OUT THE INVENTION

Figure 1:
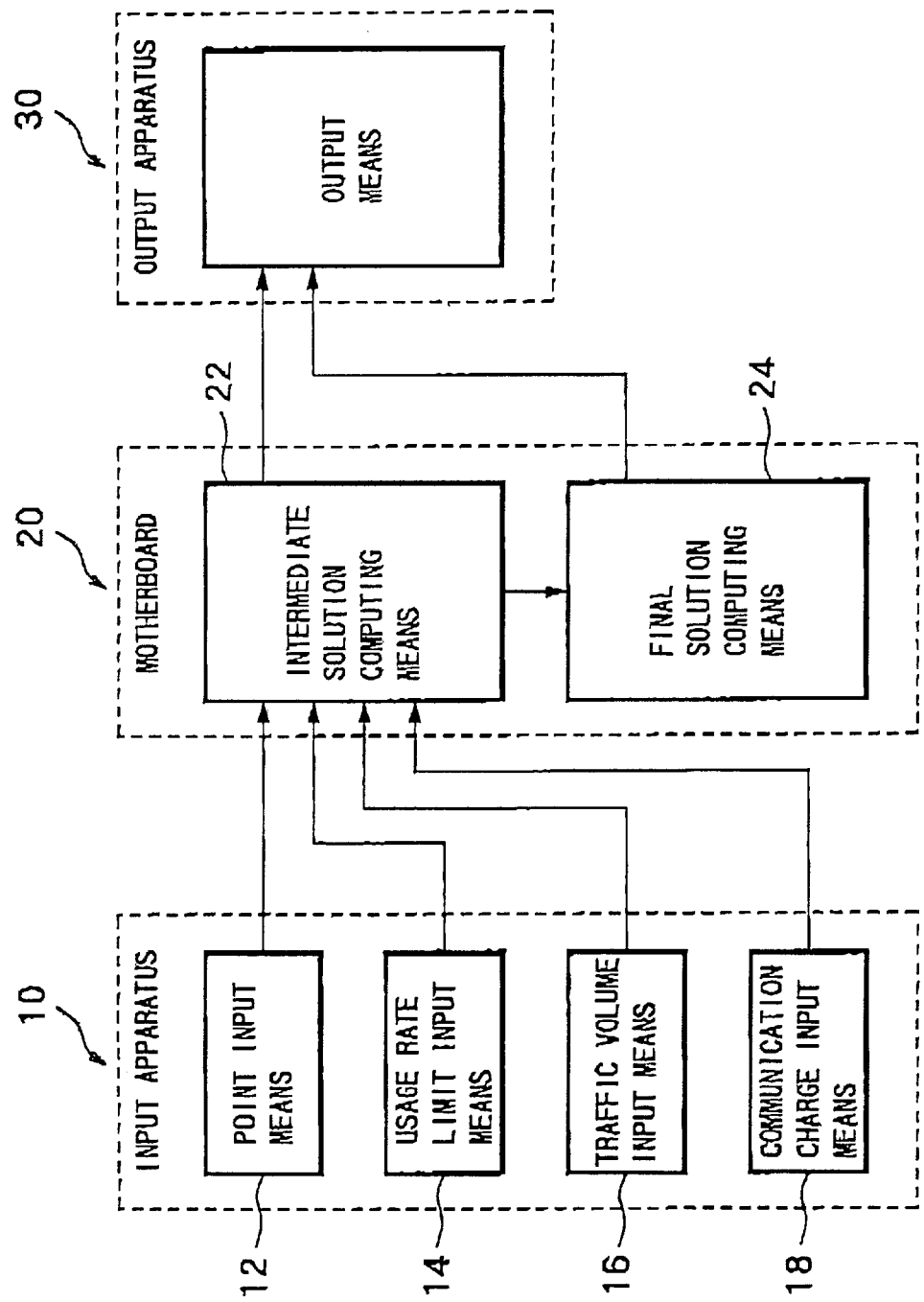
FIG. 1 is a block diagram of a network topology design apparatus according to the present invention.

As follows is a detailed description of the present invention according to the appended drawings.

Firstly, the optimization problem of network topology (referred to hereunder as "optimization problem") will be described. The optimization problem is to determine a network design such that communication cost is minimized, in other words the cost performance is the best, under a constraining condition that the communication line usage rate does not exceed a predetermined value in all communication lines connecting a plurality of points. Here, network design is to determine the points to be connected and the capacity of the communication lines connecting the points.

A network topology design apparatus (referred to hereunder as "design apparatus") according to the present invention comprises an electronic computer which is provided with at least a central processing unit (CPU) and a memory, and processes the optimization problem according to a program stored in the memory. For this purpose, formulation is required so that the optimization problem can be processed by the electronic computer, As follows is a description of the formulation of the optimization problem.

First, a constraining condition that the usage rate of the communication lines in all communication lines does not exceed a predetermined value is formulated. A communication line connecting a point i and a point j is denoted by $W_{ij}$, and the set of paths $\phi$ that traffic from the point i to the point j passes through is defined in the following equation.

$$\phi_{ij} = \{W_{il_1}, W_{l_1 l_2}, \ldots, W_{l_j}\}$$

Furthermore, the set of all $\phi_{ij}$ that can be considered is defined as $\Phi_{ij}$. From this definition, the sum of the traffic volume passing through the communication line $W_{ij}$ is expressed as the following equation.

$$\sum_{W_{ij} \in \phi_{i'j'}} t_{i'j'}$$

Consequently, the constraining condition that the usage rate of the communication lines in all the communication lines does not exceed a predetermined value is expressed as the following equation.

$$\sum_{W_{ij} \in \phi_{i'j'}} t_{i'j'} \leq \tau_{ij} c_{z_j} \forall i, j$$

The existence of $\phi_{ij} \in \Phi_{ij}$ that satisfies this condition in all pairs of $\{i, j\}$ ($i \neq j$) becomes the restraining condition.

Here, the traffic volume from the point i to the point j is represented by $t_{ij}$, the usage rate limit of the communication lines by $r_{ij}$, the type of communication line connecting the point i and the point j by $x_{ij}$, and the capacity of a communication line k (k=$x_{ij}$) by $c_k$. The usage rate $r_{ij}$ is set in the range $0 \leq r_{ij} \leq 1$. The number of type of line $x_{ij}$ is set to $x_{ij}=0$ when it does not connect the points, and when the type of communication line is set to m, it satisfies the relationship of $x_{ij}=\{0, 1, 2, \ldots m\}$, $x_{ii}=0$, $x_{ij}=x_{ji}$.

Moreover, if the charge when connecting the point i and the point j by the communication line k is $p_{ij}^k$, and the number of points is n, then the communication cost is expressed as the following equation. Here, the charge $p_{ij}^k$ is $p_{ij}^o=0$ when it does not connect the points.

$$\sum_{i=1}^{n-1} \sum_{j=i+1}^{n} p_{ij}^{x_{ij}}$$

A solution of the optimization problem is to determine a network design such that the communication cost is minimized and hence, from the abovementioned description, the optimization problem is formulated as the following equation.

minimize $$\sum_{i=1}^{n-1} \sum_{j=i+1}^{n} p_{ij}^{x_{ij}}$$

subject to $$\forall_{u,v} \exists_{\Phi_{u,v} \in \Phi u, v}$$

$$s.t. \forall_{i,j} \sum_{W_{ij} \in \phi'i'j'} t_{i'j'} \le r_{ij} c_{x_{ij}}$$

$x_{ij}=0, 1, 2, \ldots, m$
$x_{ii}=0$
$x_{ij}=x_{ji}$

Next is a description of a design apparatus for automatically computing the solution of the optimization problem.

The design apparatus, as shown in FIG. 1, comprises an input means 10 such as a keyboard, a mouse and the like, a motherboard 20 comprising a CPU, a memory and the like, and an output means such as a monitor and the like.

The input means 10 functions as a point input means 12, a usage rate limit input means 14, a traffic volume input means 16 (traffic volume input means, traffic volume input function), and a communication charge input means 18 (cost information input means, cost information input function). The point input means 12 provides a function for inputting the number of points n, the point names, and the like constructing a network. The usage rate limit input means 14 provides a function for inputting the usage rate $r_{ij}$ of the communication lines. The traffic volume input means 16 provides a function for inputting the traffic volume $t_{ij}$ between the respective points. The communication charge input means 18 provides a function for inputting the communication charge $p_{ij}^k$ between the points corresponding to a number of types of communication lines m.

The motherboard 20 functions as an intermediate solution computing means 22 and a final solution computing means 24. The intermediate solution computing means 22 applies a genetic algorithm (GA) to compute an intermediate solution to the optimization problem. The final solution computing means 24 searches a solution by a local search method for the intermediate solution computed by the intermediate solution computing means 22 to compute a final solution to the optimization problem.

Here, the intermediate solution computing means 22 realizes by means of software chromosome creation means, communication path determination means, line capacity determination means, fitness computing means, chromosome evolution means, generation judgment means, first control means, a chromosome creation step, a communication path determination step, a line capacity determination step, a fitness computing step, a chromosome evolution step, a generation judgment step, a control step, a chromosome creation function, a communication path determination function, a line capacity determination function, a fitness computing function, a chromosome evolution function, a generation judgment function, and a control function. Furthermore, the intermediate solution computing means 22 also realizes by means of software; extraction means, chromosome division means, first evolution means, mutation determination means, second evolution means, uniformity computing means, second control means and evolution inhibiting means.

The final solution computing means 24 realizes chromosome search means by means of software.

The output means 30 displays the intermediate solution computed by the intermediate solution computing means 22, and the final solution computed by the final solution computing means 24, and the like.

Figures 2, 3:
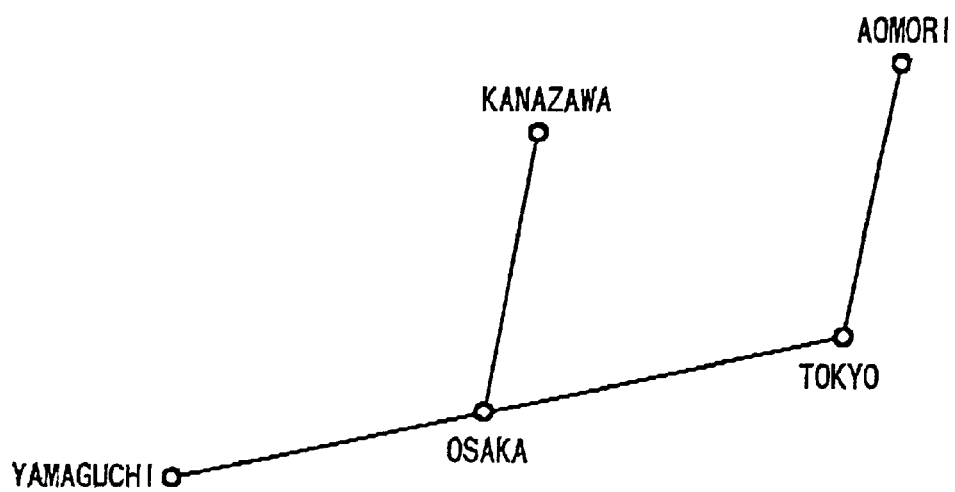
FIG. 2 shows an example of a network construction object.
FIG. 3 is a diagram for explaining a chromosome used in genetic algorithms.

A method of applying the genetic algorithm to the intermediate solution computing means 22 will now be described. Firstly, the optimization problem is divided into two; a problem of "which points are to be connected", and a problem of "determination of the capacity of the communication lines to be connected", and the former problem is expressed by chromosomes. For example, in the case where 5 points (n=5), Aomori, Kanazawa, Tokyo, Osaka and Yamaguchi, as shown in FIG. 2 are connected, a chromosome whose shape is an upper triangle of a matrix n×n as shown in FIG. 3 is used. Each gene composing the chromosome is represented by "1" if the point i and the point j are connected, and is represented by "0" if not Here, the chromosome shown in FIG. 3 indicates a situation in that with Aomori being "1", Kanazawa, "2", Tokyo, "3", Osaka, "4", and Yamaguchi, "5", a network as shown in FIG. 2 is constructed.

Furthermore, to compute the intermediate solution to the optimization problem, the traffic volume (refer to FIG. 4) between the respective points constructing the network, and the communication charge table (refer to FIG. 5) corresponding to the communication lines connecting the respective points are required. Here, the communication charge table shown in FIG. 5 corresponds to the capacity of the communication lines.

Next is a description of the operation of the design apparatus.

Figure 6:
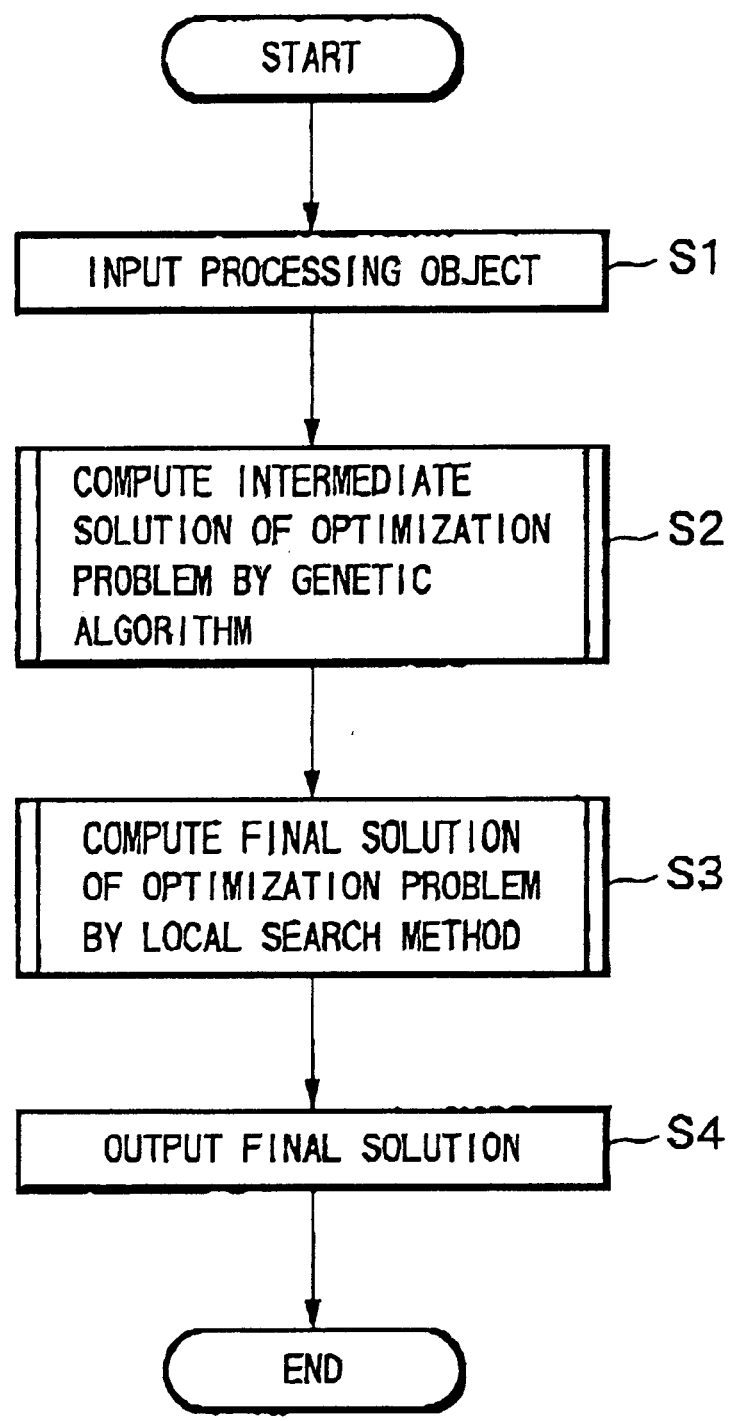
FIG. 6 is a flow chart of a main routine showing processing of the network topology design apparatus.

FIG. 6 shows a flow chart of the main routine.

In step 1 (abbreviated to "S1" in the figure, similarly hereunder), a processing object of the optimization problem is input. That is to say, a number of points n constructing a network, the traffic volume $t_{ij}$ between the points (refer to FIG. 4), the communication charge $p_{ij}^k$ corresponding to the capacity of the communication lines etc. (refer to FIG. 5), the usage rate $r_{ij}$, and the like are input In step 2, a subroutine for computing an intermediate solution of the optimization problem is called by the genetic algorithm.

In step 3 with the intermediate solution computed by the genetic algorithm, all solutions in the neighborhood are searched repeatedly by the local search method, and a subroutine is called to compute the final solution of the optimization problem. Cost performance of the network is optimized by the network topology specified by the final solution.

In step 4, the final solution of the optimization problem is output to the output means 30.

Figure 7:
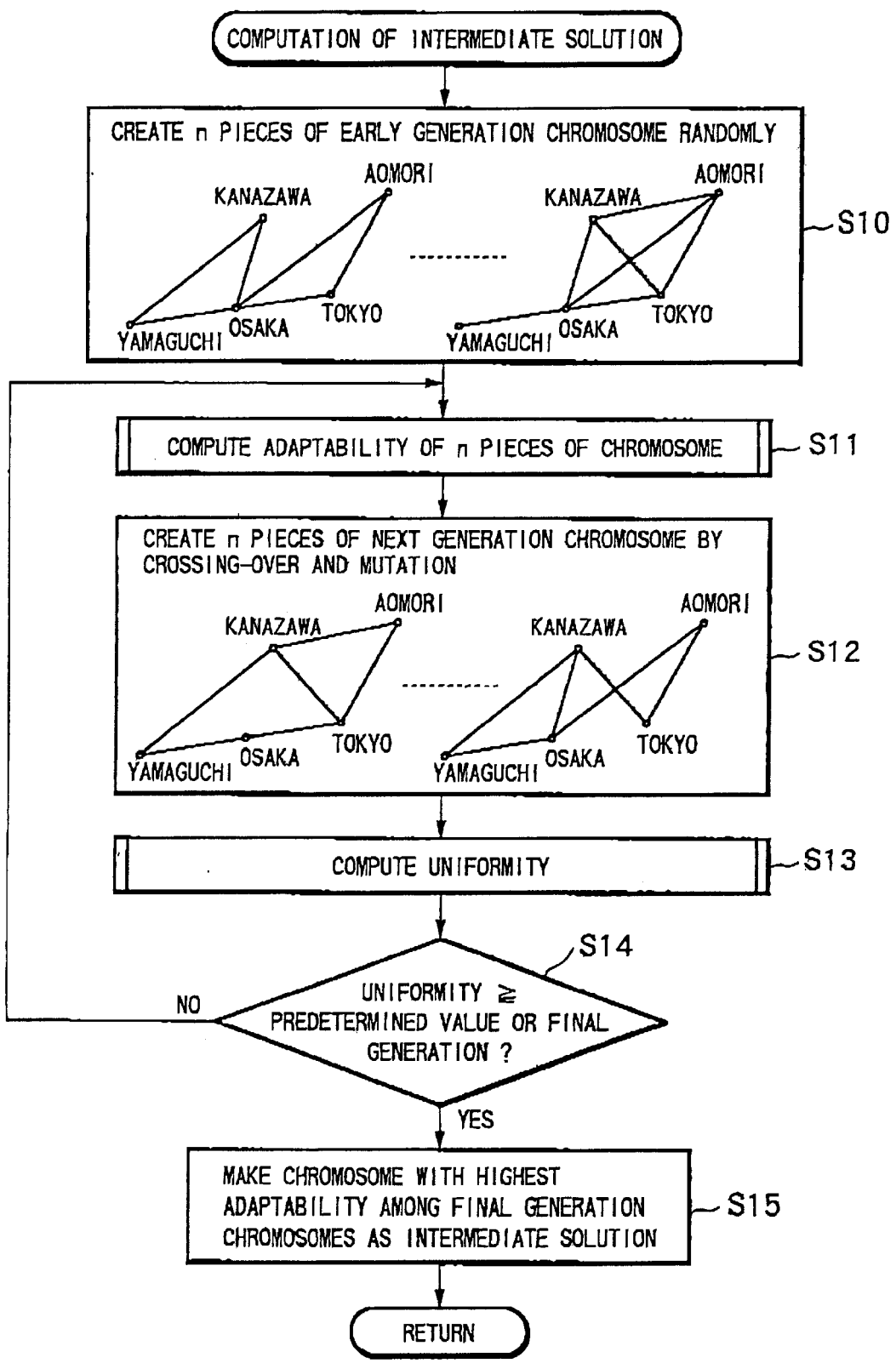
FIG. 7 is a flow chart of a subroutine for computing an intermediate solution to the optimization problem by genetic algorithms.

FIG. 7 shows a subroutine for computing an intermediate solution to the optimization problem by the genetic algorithm, In step 10, n pieces of initial generation chromosomes are randomly created. That is to say, n pieces of chromosomes as shown in FIG. 3 are prepared, and the genes of each chromosome are set to "1" or "0" by using random numbers and the like. Here, the processing of step 10 corresponds to the chromosome creation means, the chromosome creation step and the chromosome creation function.

In step 11, a subroutine for computing the fitness of n pieces of chromosomes is called, "Fitness" means the inverse of communication cost Here, the processing of step 11 corresponds to the fitness computing means, the fitness computing step and the fitness computing function.

In step 12, a subroutine for performing typical methods of the genetic algorithm, namely crossing-over and mutation, on n pieces of chromosomes is called to create n pieces of next generation chromosomes. With such methods, chromosomes are evolved gradually so as to adapt to the optimization problem, Here, the processing of step 12 corresponds to the chromosome evolution means, the chromosome evolution step and the chromosome evolution function.

Furthermore, in step 12, when creating next generation chromosomes, an "elite strategy" by which an excellent chromosome is inherited by the next generation as it is, may be applied, or a "fixed part" that prevents a specific gene composing the chromosome from mutating may be set. Here, the process of setting such a "fixed part" corresponds to the evolution inhibiting means.

In step 13, a subroutine for computing uniformity is called. "Uniformity" means, in the case where n pieces of chromosomes have 1 gene each, the ratio of how many genes among all genes ln (l×n) pieces correspond to the genes of the chromosome having the highest fitness. When the uniformity is close enough to "1", it is considered that a majority of the chromosomes at the current generation are similar, and the genes do not much change except for mutation. Consequently, it can be used to determine the timing of terminating the genetic algorithm. Here, the processing of step 13 corresponds to the uniformity computing means.

In step 14, it is judged whether or not the uniformity is greater than or equal to a predetermined value, or whether or not the generation is a final generation. "Final generation" means the final generation subsequently created by crossing-over and mutation, which is a generation to be set by a user. If the uniformity is greater than or equal to the predetermined value, or the generation is the final generation, control proceeds to step 15 (Yes), and if the uniformity is less than the predetermined value, and the generation is not the final generation, control returns to step 11 (No). Here, the processing of step 14 corresponds to the generation judgment means, the generation judgment step, the generation judgment function, the first control means, the control step, and the control function.

In step 15 the chromosome with the highest fitness is extracted from among the chromosomes that are at the final generation, or the uniformity of which has become greater than or equal to the predetermined value, and is output to the output means 30.

Figure 8:
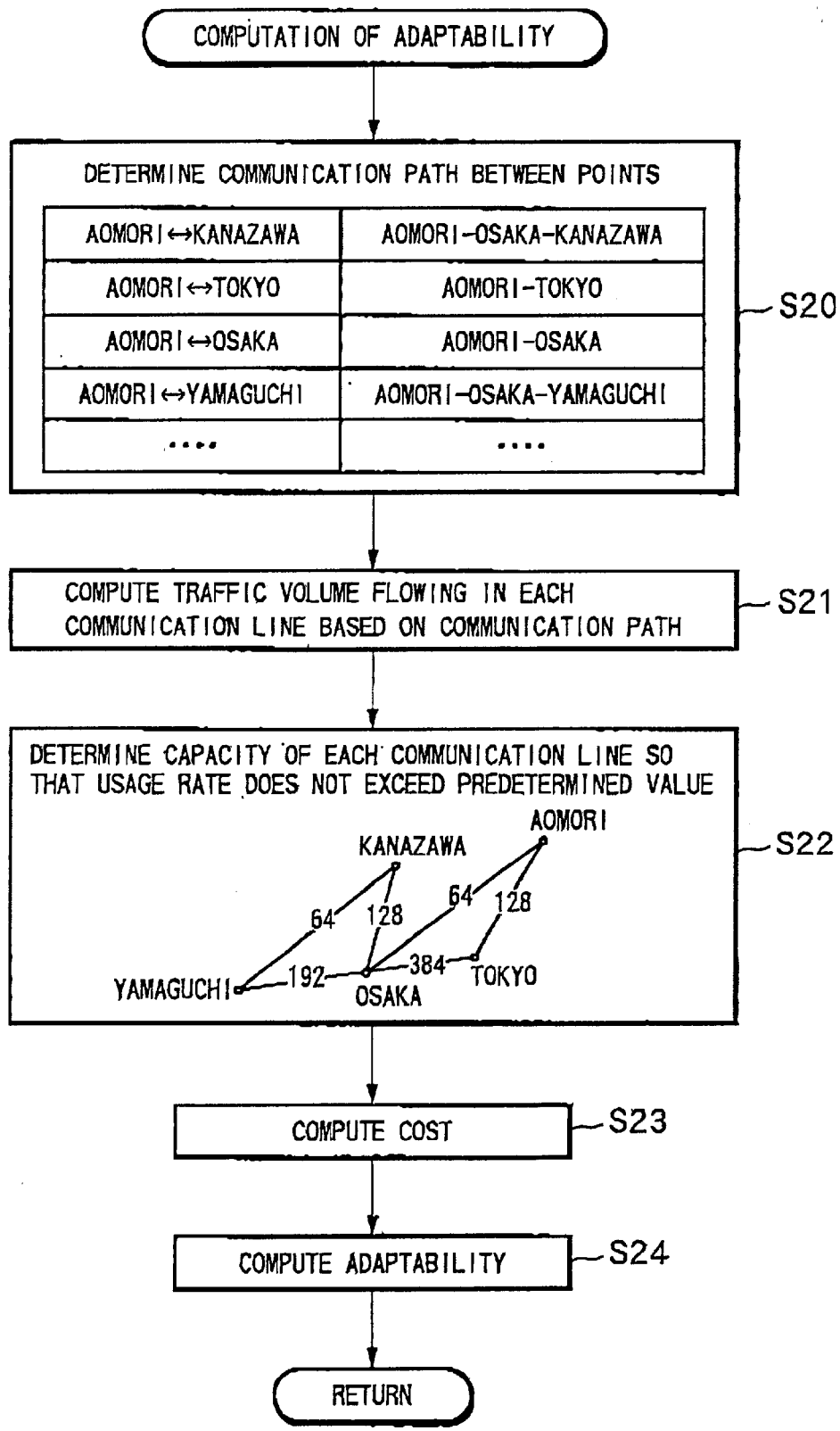
FIG. 8 is a flow chart of a subroutine for fitness calculation.

FIG. 8 shows a subroutine for computing fitness.

In step 20, a communication path between the respective points is determined by the Warshall-Floyd method, which is a solution of the shortest path problem. The Warshall-Floyd method is a solution that in the case where the number of points is n, the $i^{th}$ point is $L_i$, and the distance between the point i and the point j is $d_{ij}$, the shortest path is determined by the following procedure, Here, "distance $d_{ij}$" is not limited to a physical distance, and may be a conceptual distance such as cost, time and the like. Furthermore, in the case where the point i and the point j are not connected, the distance $d_{ij}=\infty$.

(1) Procedure 1
Assign $d_{ij}^{(0)}=d_{ij}$, $p_{ij}=i$ (i, j=1, 2, 3, ..., n), l=1.
(2) Procedure 2
(a) Assign $d_{ij}^{(l)}=\min(d_{ij}^{(l-1)}, d_{il}^{(l-1)}+d_{lj}^{(l-1)})$
(b) Assign $p_{ij}=p_{lj}$ for (i, j) in $d_{ij}^{(l)}<d_{ij}^{(l-1)}$
(3) Procedure 3
If l=n, control terminates. If l<n, the value of l is increased by 1, and control returns to procedure 2.

Here, $d_{ij}^{(l)}$ indicates a path from $L_i$ to $L_j$, and is the shortest distance among those that allow only $L_1$, $L_2$, ..., $L_l$ as passing points along the way. When traveling as far as l=n, $d_{ij}^{(l)}$ is the shortest path from $L_i$ to $L_j$, and $p_{ij}$ is the number of a point immediately before $L_j$ on the shortest path from $L_i$ to $L_j$.

Here, the series of processing in step 20 corresponds to the communication path determination means, the communication path determination step, and the communication path determination function.

In step 21, based on the communication path determined by the Warshall-Floyd method, the traffic volume of each communication line connecting the points is computed, That is to say, the traffic volume between the respective points on each communication line is summed to compute the traffic volume of each communication line.

In step 22, the capacity of each communication fine is determined such that the usage rate of the communication line does not exceed a predetermined value. Here, the processing of step 21 and step 22 corresponds to the line capacity determination means, the fine capacity determination step, and the line capacity determination function.

In step 23, the communication charge of each communication line is computed with reference to the communication charge table, and the communication cost is computed by summing the communication charges of all communication lines, In step 24, the fitness is computed by computing the inverse of the communication cost. That is to say, fitness= 1/communication cost.

Figure 9:
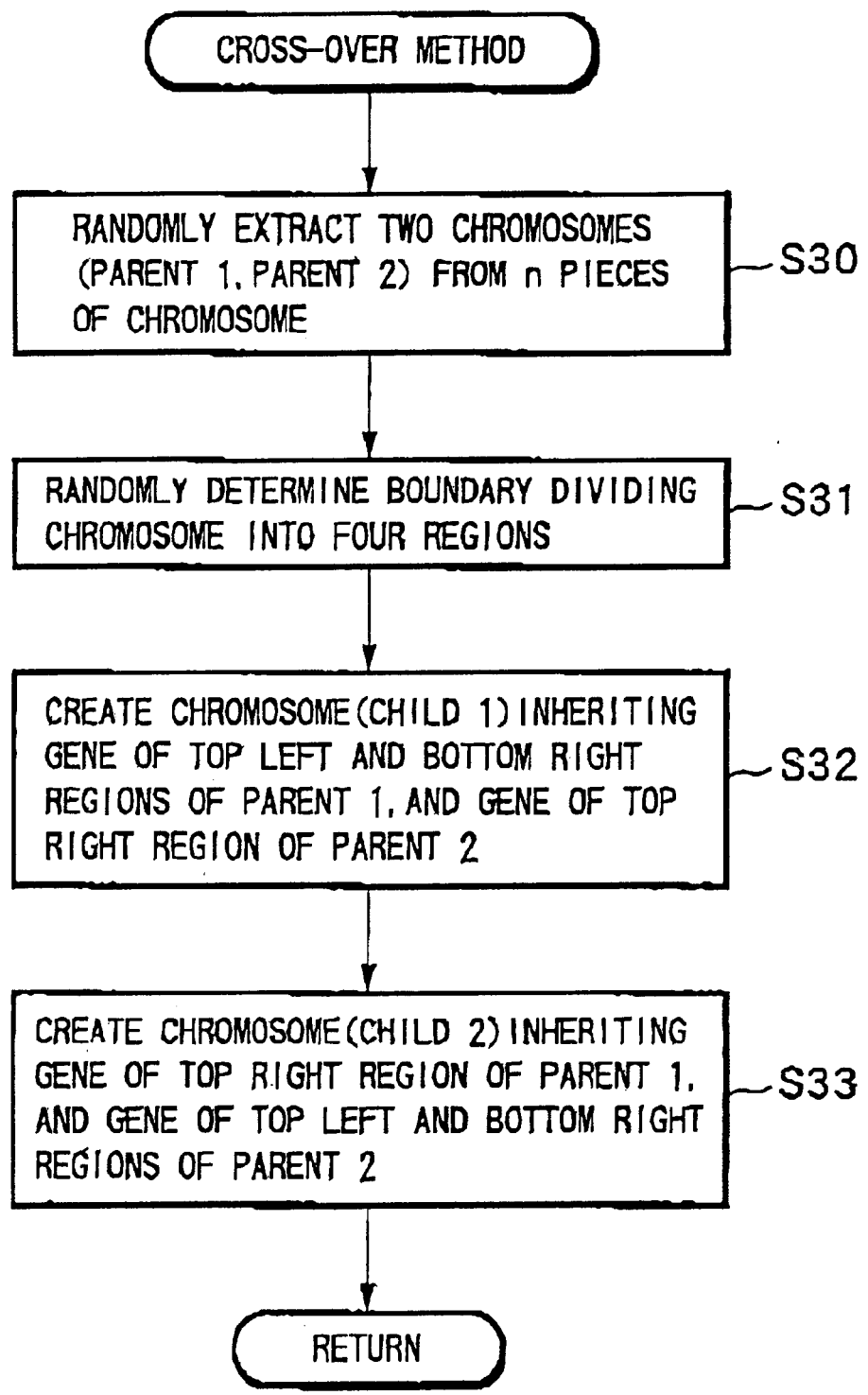
FIG. 9 is a flow chart of a subroutine for creating a next generation chromosome by a cross-over method.

FIG. 9 shows a subroutine for creating a next generation chromosome by the crossover method. Here, the cross-over method is performed by a predetermined probability set in advance.

Figure 10:
FIG. 10 is a diagram for explaining the cross-over method.

In step 30, two chromosomes being a parent 1 and a parent 2 are extracted by a probability in proportion to the fitness among n pieces of the current generation chromosomes, Here, the processing of step 30 corresponds to the extraction means, In step 31, a boundary to divide the rows and columns of the extracted chromosomes (parent 1 and parent 2) into two is determined. Then, as shown in FIG. 10, the rows and columns of the chromosome are divided into two by the boundary. That is to say, the chromosome is divided into 4 regions (a gene does not exist in the bottom left region). Here, the processing of step 31 corresponds to the chromosome division means.

In step 32, as shown in FIG. 10, a chromosome (child 1) that inherits the genes belonging to the top left and bottom right regions of parent 1, and the genes belonging to the top right region of parent 2 is created, In step 33, as shown in FIG. 10, a gene (child 2) that inherits the genes belonging to the top right region of parent 1, and the genes belonging to the top left and bottom right regions of parent 2 is created. Here, the processing of step 32 and step 33 corresponds to the first evolution means.

Figure 11:
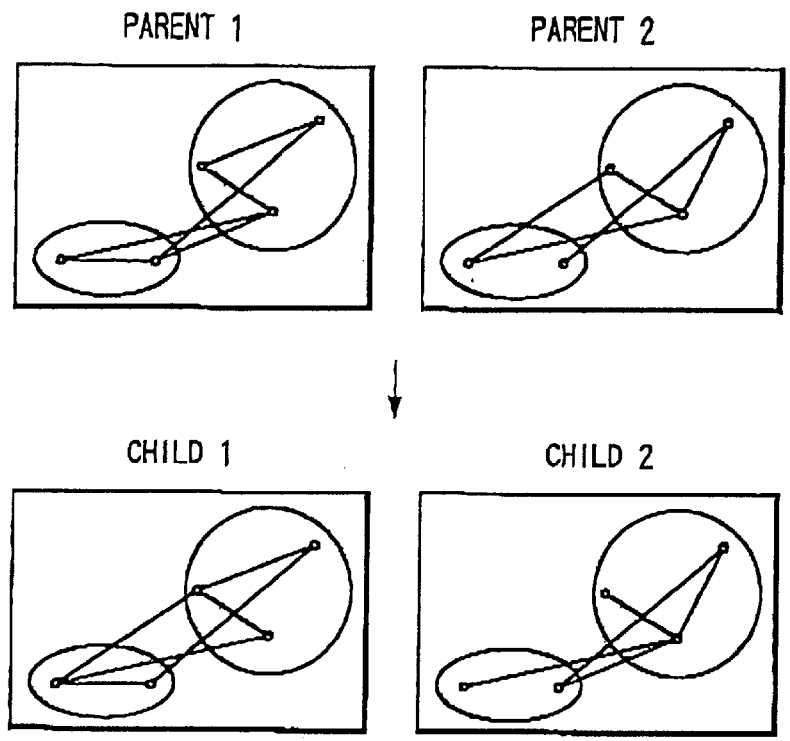
FIG. 11 is a diagram for explaining character heredity by the crossover method.

With the crossover method explained above, as shown in FIG. 11, the points are divided into two groups, and a child is created whose connection mode inside the group is inherited from one parent, and connection mode between the groups from the other parent. That is to say, the child is created inheriting characteristics of the connection mode inside the group from one parent, while inheriting the connection mode between the groups from the other parent.

Figure 12:
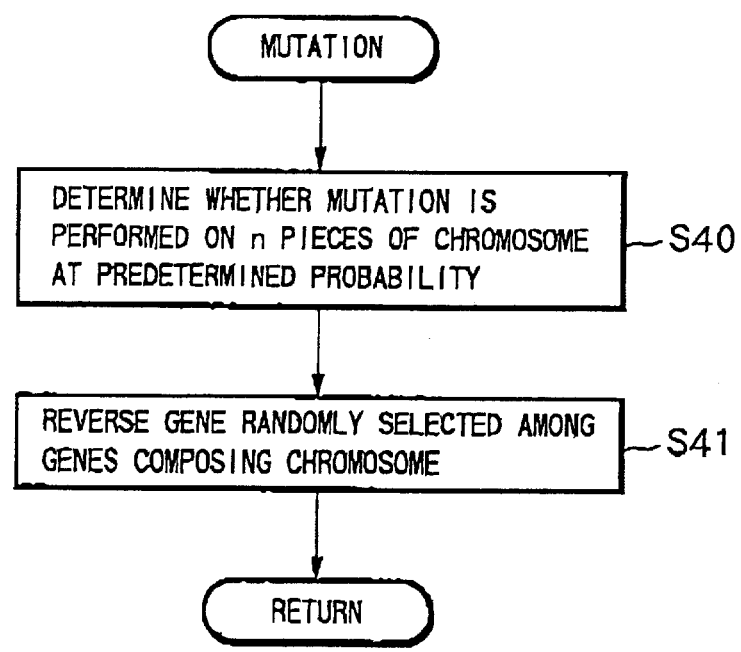
FIG. 12 is a flow chart of a subroutine for creating a next generation chromosome by mutation.

FIG. 12 shows a subroutine for creating next generation chromosomes by mutation.

In step 40, it is judged individually on each of n pieces of the current generation chromosomes using a predetermined probability set in advance as to whether or not mutation is to be performed. Here, the processing of step 40 corresponds to the mutation determination means.

In step 41, a gene randomly selected from among the genes composing the chromosomes determined to be mutated is reversed. That is to say, if the gene is "0", it is reversed to "1", and if the gene is "1", to "0". Here, the processing of step 41 corresponds to the second evolution means.

Figure 13:
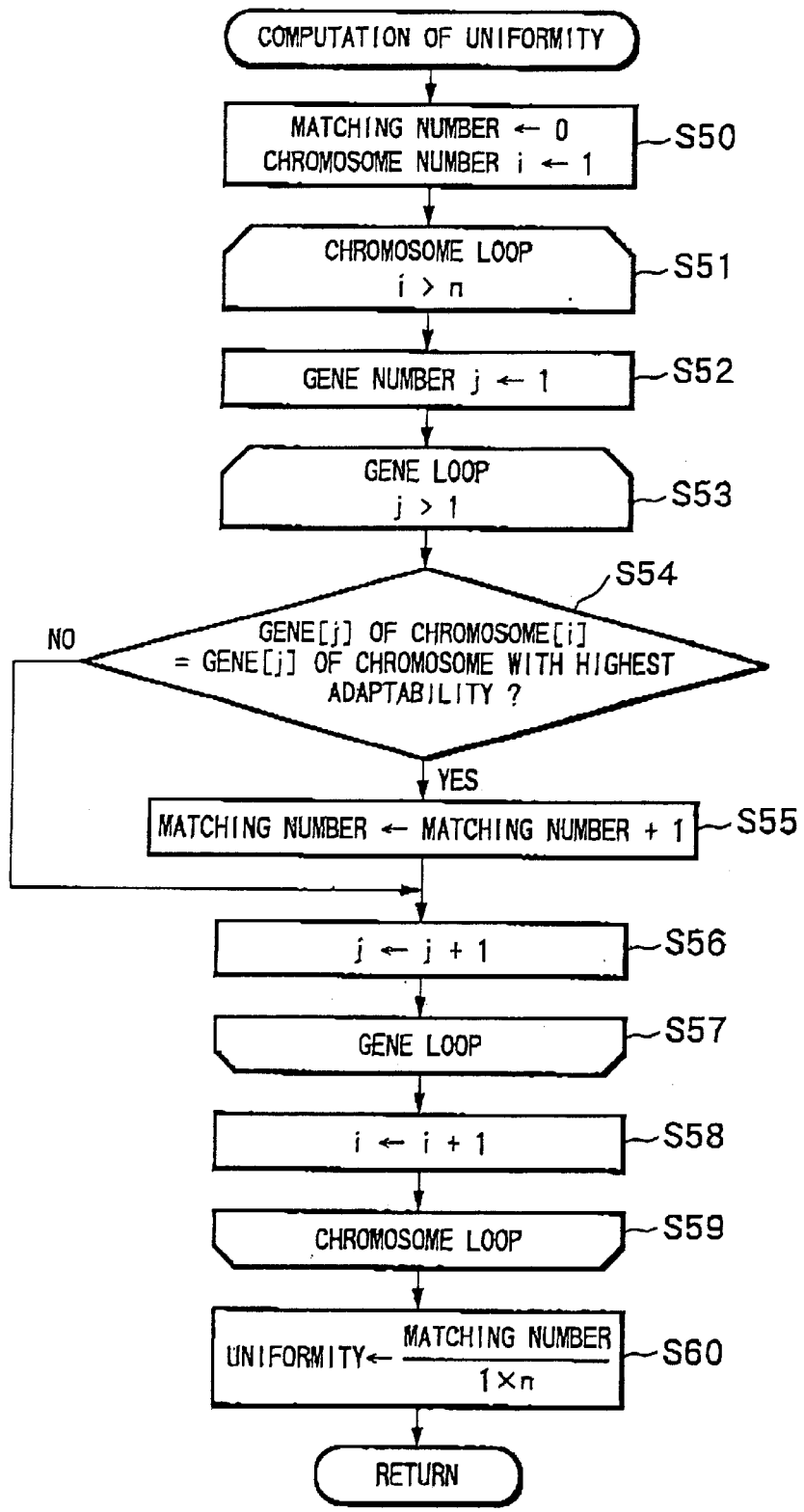
FIG. 13 is a flow chart of a subroutine for computing uniformity.

FIG. 13 shows a subroutine for computing uniformity.

In step 50, the initialization for setting the number of matches to "0", and the chromosome number i to "1" is performed.

In step 51, a loop control for repeating the processing of step 52 through step 59 is performed until the chromosome number i becomes greater than the number of chromosomes n. That is to say, if the chromosome number i is less than or equal to the number of chromosomes n, control proceeds to step 52, and if the chromosome number i is greater than the number of chromosomes n, control proceeds to step 60.

In step 52, initialization for setting the gene number j to "0" is performed.

In step 53, a loop control for repeating the processing of step 54 through step 57 is performed until the gene number i becomes greater than the number of genes I (indicating the number of genes contained in one chromosome). That is to say, if the gene number j is less than or equal to the number of genes l, control proceeds to step 54, and if the gene number j is greater than the number of genes l, control proceeds to step 58.

In step 54, it is judged whether or not the $j^{th}$ gene in the $i^{th}$ chromosome matches the $j^{th}$ gene in the chromosome with the highest fitness. If the gene matches, control proceeds to step 55 (Yes), and the number of matches is increased by one. On the other hand, if the gene does not match, control proceeds to step 56 (No).

In step 56, the gene number j is increased by 1.

In step 57, control jumps to step 53.

In step 58, the chromosome number i is increased by 1.

In step 59, control jumps to step 51.

In step 60, the uniformity is computed by dividing the number of matches by the number of all chromosomes (l×n).

With the processing of step 50 through step 60, each chromosome existing in the current generation is compared with the chromosome having the highest fitness in the current generation. To be specific, the number of genes that match the gene composing the chromosome with the highest fitness among all genes (l×n) comprising the chromosomes is counted and uniformity, that is the matching ratio, to all the genes is computed.

Figure 14:
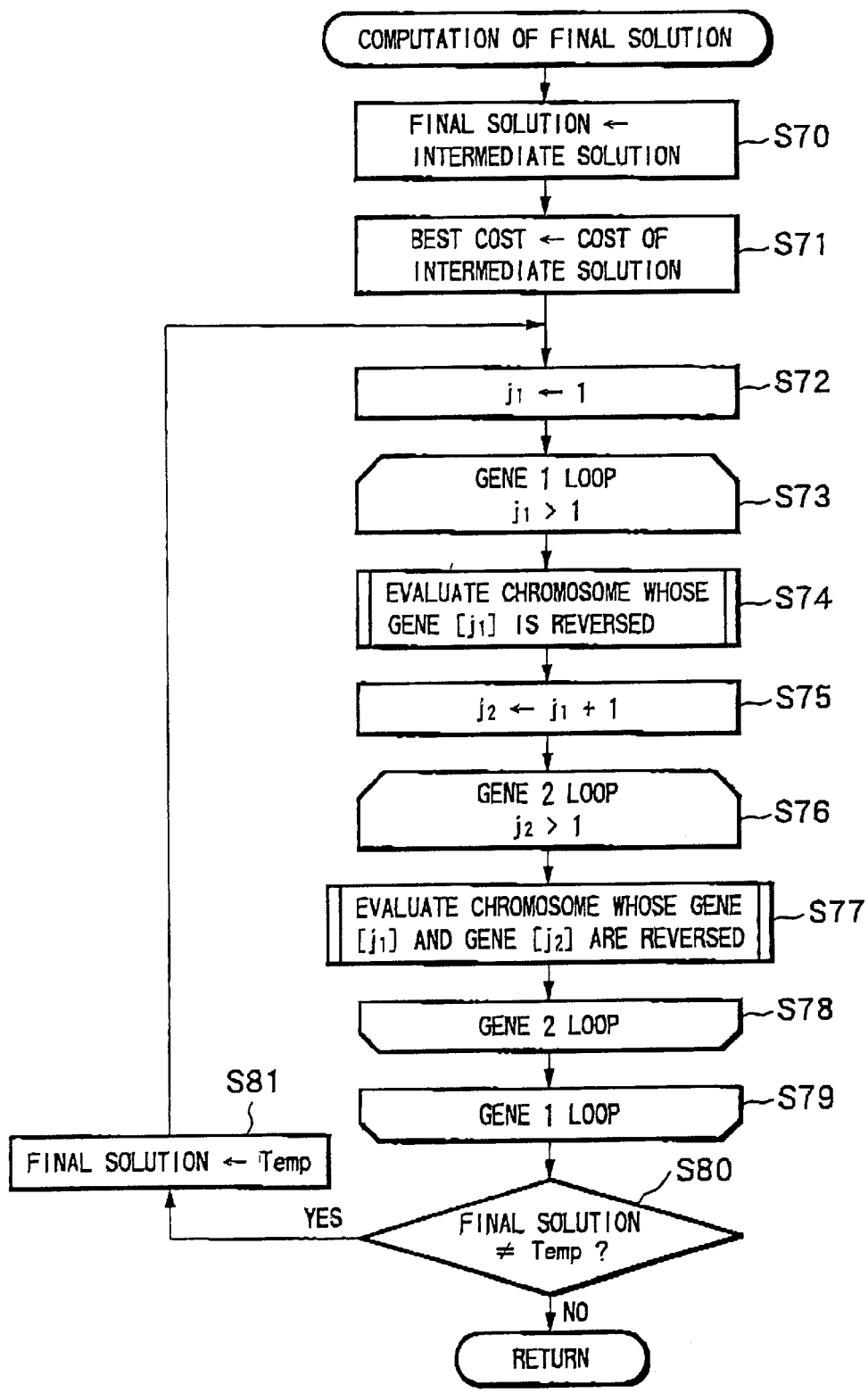
FIG. 14 is a flow chart of a subroutine for computing a final solution to the optimization problem by a local search method.

FIG. 14 shows a subroutine for computing the final solution to the optimization problem, serving as the chromosome search means.

In step 70, the intermediate solution computed by the genetic algorithm is stored as the final solution.

In step 71, the communication cost of the intermediate solution is computed, and the computed communication cost is stored as the best cost. Here, the communication cost is computed by the processing of step 20 through step 23 in FIG. 8.

In step 72, the gene number $j_1$ is set to "1".

In step 73, a loop control for repeating the processing of step 74 through step 79 until the gene number $j_1$ becomes greater than the number of genes l is performed. That is to say, if the gene number $j_1$ is less or equal to the number of the genes 1, control proceeds to step 74, and if the gene number $j_1$ is greater than the number of genes 1, control proceeds to step 80.

In step 74, a subroutine is called for evaluating a chromosome whose gene "$j_1$" is reversed. In this subroutine, if the communication cost of the chromosome whose gene "$j_1$" is reversed is more superior than the best cost, the chromosome (solution) whose gene "$j_1$" is reversed is stored in variable Temp. Here, by reversing one gene, operations whereby anew communication line is added, and one of the present communication lines is removed are performed.

In step 75, the gene number $j_2$ is set to "$j_1+1$".

In step 76, a loop control for repeating the processing of step 77 and step 78 until the gene number $j_2$ becomes greater than the number of genes l is preformed. That is to say, if the gene number $j_2$ is less than or equal to the number of genes l, control proceeds to step 77, and if the gene number $j_2$ is greater than the number of genes l, control proceeds to step 80.

In step 77, a subroutine for evaluating a chromosome whose genes "$j_1$", and "$j_2$" are reversed is called. This subroutine is the same as the subroutine called in step 74. Here, by reversing two genes, operations whereby two new communication lines are added, two of the present communication lines are removed, and one of the present communication lines is removed and one new line is added are performed.

In step 78, control jumps to step 76.

In step 79, control jumps to step 73.

In step 80, it is judged whether or not the final solution matches variable Temp, in other words, whether or not the solution has changed. Then, if the solution has changed, control proceeds to step 81 (Yes), and the variable Temp is made as the final solution. On the other hand, if the solution has not changed, control proceeds to step 82 (No).

Figure 15:
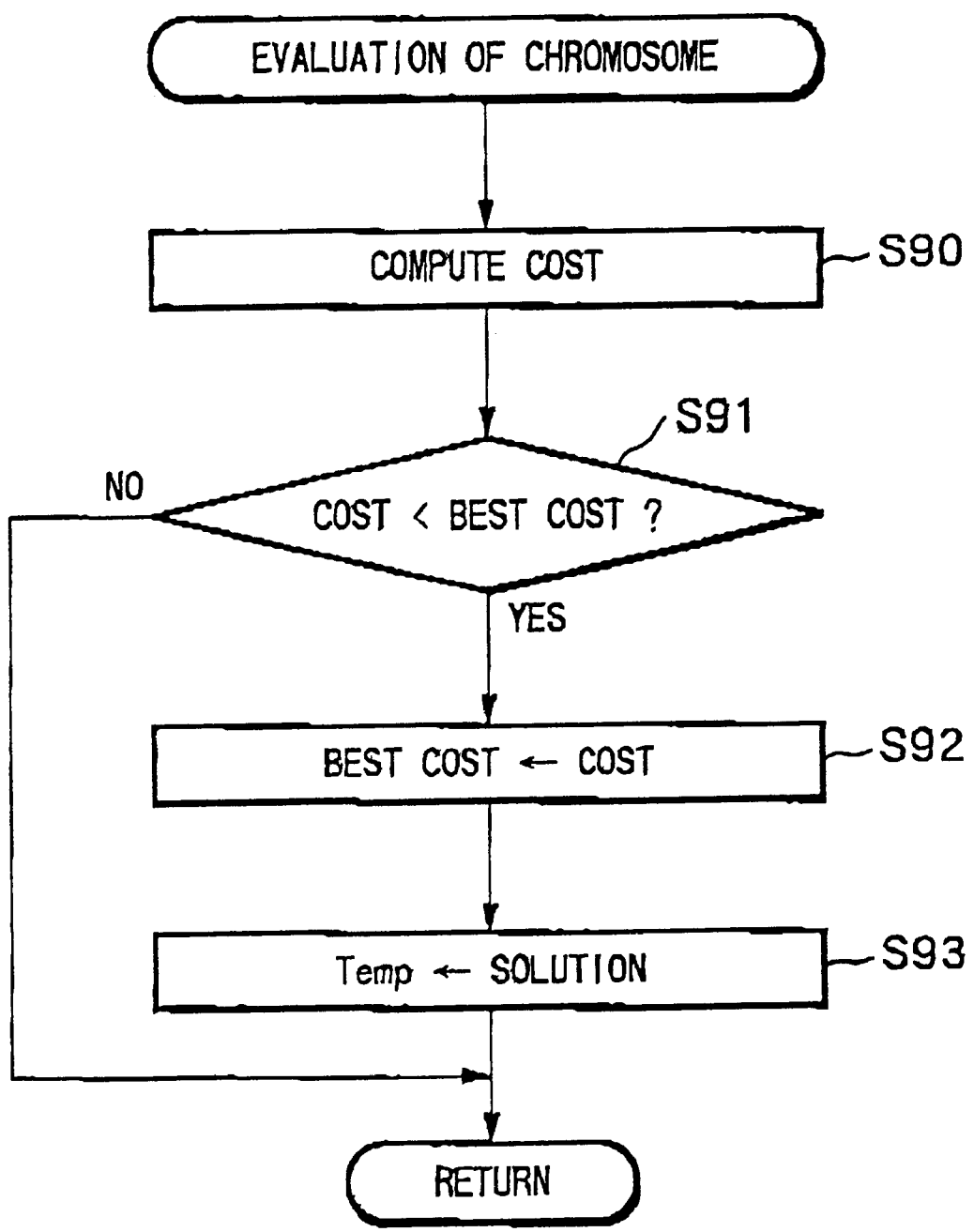
FIG. 15 is a flow chart of a subroutine for evaluating chromosomes in the local search method.

FIG. 15 shows a subroutine for evaluating chromosomes.

In step 90, the communication cost of the network topology represented by chromosomes is computed, The communication cost is computed by the processing of step 20 through step 23, in FIG. 8.

In step 91, it is judged whether the computed communication cost is less than the best cost. If the communication cost is less than the best cost, control proceeds to step 92 (Yes), and if the communication cost is greater than or equal to the best cost, control is terminated (No).

In step 92, the computed communication cost is made as the best cost.

In step 93, the chromosome of the object being processed is stored in variable Temp.

With the local search method described above, since solutions in the neighborhood of the intermediate solution computed by the genetic algorithm are searched repeatedly, it is possible to compute a solution that demonstrates better cost performance.

By recording a program realizing these functions onto portable media such as, for example, magnetic tapes, magnetic disks, magnetic drums, IC cards and CD-ROMs, the network topology design program according to the present invention can be distributed to the market. Then, any person acquiring such media can easily construct a network topology design apparatus using a typical electronic computer system.

Industrial Applicability

As described above, the network topology design apparatus and the network topology design method according to the present invention can construct networks with excellent cost performance, and hence it has high utility. Furthermore, the recording media on which the network topology design program of the present invention is recorded can easily construct the network topology design apparatus using a typical electronic computer, and hence it has high utility.

What is claimed is:

1. A network topology design apparatus for designing a network topology connecting a plurality of points by communication lines by adopting a genetic algorithm so that a predetermined traffic volume can be transmitted between the plurality of points, comprising:

chromosome creation means for randomly creating a predetermined number of early generation chromosomes representing presence or absence of connection between the respective points in said network topology in two-dimensional matrix;

communication path determination means for determining a communication path between the respective points by applying the solution of a shortest path problem to each network topology represented by the chromosome;

line capacity determination means for, based on the communication path determined by said communication path determination means and the predetermined traffic volume, determining the capacity of each communication line connecting the points;

adaptability calculation means for, based on the capacity of each communication line determined by said line capacity determination means, computing adaptability that is inversely proportional to communication cost;

chromosome evolution means for, based on the adaptability computed by said adaptability calculation means, evolving sequentially the predetermined number of chromosomes to the next generation chromosomes;

generation judgment means for judging whether or not the generation of the chromosome evolved by said chromosome evolution means has reached a predetermined generation; and first control means for, when it is judged by said generation judgment means that the generation has not yet reached the predetermined generation, repeating the processing of said communication path determination means and the subsequent means, and when judged that the generation has reached the predetermined generation, for outputting the chromosome with the highest adaptability among the predetermined number of chromosomes.

2. A network topology design apparatus according to claim 1, wherein said chromosome evolution means includes:

extraction means for extracting two chromosomes from among the predetermined number of chromosomes corresponding to the adaptability;

chromosome division means for dividing the points into two groups with respect to each chromosome extracted by said extraction means; and first evolution means for inheriting the connection mode inside the group divided by said chromosome division means from one chromosome and for evolving the connection mode between the groups to the next generation chromosome inherited from the other chromosome.

3. A network topology design apparatus according to claim 1, wherein said chromosome evolution means includes:

mutation determination means for determining whether or not to perform mutation on all of the predetermined number of chromosomes by a predetermined probability set in advance; and second evolution means for mutating an element randomly selected from among the elements of a matrix comprising the chromosome on which mutation is determined to be performed by said mutation determination means and for evolving to the next generation chromosome.

4. A network topology design apparatus according to claim 1, wherein there is provided usage rate limit input means for inputting a usage rate limit of the communication lines connecting between the points, and said line capacity determination means determines the capacity of the communication lines connecting between the points such that the usage rate of the communication lines is less than or equal to the usage rate limit input by said usage rate limit input means.

5. A network topology design apparatus according to claim 1, wherein there is provided evolution inhibiting means for inhibiting the evolution of a predetermined element among the elements of a matrix comprising the chromosome.

6. A network topology design apparatus according to claim 1, wherein there is provided chromosome search means for searching a chromosome with higher adaptability by repeated search of chromosomes in the vicinity of the chromosome output by said first control means, by applying a local search method.

7. A network topology design apparatus for designing a network topology connecting a plurality of points by communication lines by adopting a genetic algorithm so that a predetermined traffic volume can be transmitted among the plurality of points, comprising:

chromosome evolution means for sequentially evolving a predetermined number of chromosomes representing presence ir absence of connection between the respective points in the network topology in a two-dimensional matrix to the next generation chromosomes by adopting the genetic algorithm;

uniformity computing means comparing each chromosome evolved to the next generation by said chromosome evolution means with the chromosome having the lowest communication cost of the same generation and for computing uniformity which is the rate at which the elements of the matrix comprising the chromosomes are matched; and second control means for, when the uniformity computed by said uniformity computing means is less than a predetermined value, evolving the chromosome to the next generation by the chromosome evolution means, and when the uniformity becomes greater than or equal to the predetermined value, outputting the chromosome having the lowest communication cost among the predetermined number of chromosomes.

8. A network topology design method of designing a network topology connecting a plurality of points by communication lines by adopting a genetic algorithm so that a predetermined traffic volume can be transmitted between the plurality of points, comprising:

a chromosome creation operation of randomly creating a predetermined number of early generation chromosomes representing presence or absence of connection between the respective points in the network topology in a two-dimensional matrix;

a communication path determination operation of determining a communication path between the respective points by applying the solution of a shortest path problem to each network topology represented by the chromosome;

a line capacity determination operation of, based on the communication path determined by said communication path determination operation and the predetermined traffic volume, determining the capacity of each communication line connecting the points;

an adaptability calculation operation of, based on the capacity of each communication line determined by said line capacity determination operation, computing adaptability that is inversely proportional to communication cost;

a chromosome evolution operation of, based on the adaptability computed by said adaptability calculation operation, evolving sequentially the predetermined number of chromosomes to the net generation chromosomes;

a generation judgment operation of judging whether or not the generation of the chromosome evolved by said chromosome evolution operation has reached a predetermined generation; and a control operation of, when it is judged by said generation judgment operation that the generation has not yet reached the predetermined generation, repeating the processing of said communication path determination operation and the subsequent operations, and when judged that the generation has reached the predetermined generation, for outputting the chromosome with the highest adaptability among the predetermined number of chromosomes.

9. A recording medium recorded with a network topology design program designing a network topology connecting a plurality of points by communication lines by adopting a genetic algorithm so that a predetermined traffic volume can be transmitted among the plurality of points, realizing:

a chromosome creation function for randomly creating a predetermined number of early generation chromosomes representing presence or absence of connection between the respective points in the network topology in a two-dimensional matrix;

a communication path determination function for determining a communication path between the respective points by applying the solution of a shortest path problem to each network topology represented by the chromosome;

a line capacity determination function for, based on the communication path determined by said communication path determination function and the predetermined traffic volume, determining the capacity of each communication line connecting the points;

an adaptability calculation function for, based on the capacity of each communication line determined by said line capacity determination function, computing adaptability that is inversely proportional to communication cost;

a chromosome evolution function for, based on the adaptability computed by said adaptability calculation function, evolving sequentially the predetermined number of chromosomes to the next generation chromosomes;

a generation judgment function for judging whether or not the generation of the chromosome evolved by said chromosome evolution function has reached a predetermined generation; and a control function for, when it is judged by said generation judgment function that the generation has not yet reached the predetermined generation, repeating the processing of said communication path determination function and the subsequent functions, and when judged that the generation has reached the predetermined generation, for outputting the chromosome with the highest adaptability among the predetermined number of chromosomes.

10. A network topology design apparatus for designing a network topology connecting a plurality of points by communication lines by adopting a genetic algorithm so that a predetermined traffic volume can be transmitted between the plurality of points, comprising:

a chromosome creation unit to randomly create a predetermined number of early generation chromosomes representing presence or absence of connection between the respective points in said network topology in a two-dimensional matrix;

a communication path determination unit to determine a communication path between the respective points by applying the solution of a shortest path problem to each network topology represented by the chromosome;

a line capacity determination unit to, based on the communication path determined by said communication path determination unit and the predetermined traffic volume, determine the capacity of each communication line connecting the points;

an adaptability unit to, based on the capacity of each communication line determined by said line capacity determination unit, compute adaptability that is inversely proportional to communication cost;

a chromosome evolution unit to, based on the adaptability computed by said adaptability calculation unit, evolve sequentially the predetermined number of chromosomes to the next generation chromosomes;

a generation determination unit to determine whether the generation of the chromosome evolved by said chromosome evolution unit has reached a predetermined generation; and a control unit to, when it is determined by said generation determination unit that the generation has not yet reached the predetermined generation, repeat the processing of said comunication path determination unit and the subsequent units, and output the chormosome with the highest adaptability among the predetermined number of chromosomes in response to determining that the generation has reached the predetermination generation.

* * * * *

UNITED STATES PATENT AND TRADEMARK OFFICE
CERTIFICATE OF CORRECTION

PATENT NO. : 6,912,207 B2
APPLICATION NO. : 09/725469
DATED : June 28, 2005
INVENTOR(S) : Ohnishi et al.

It is certified that error appears in the above-identified patent and that said Letters Patent is hereby corrected as shown below:

column 15, line 27 after "in" insert --a-- column 16, line 55 delete "ir" and insert --or-- column 17, line 32 delete "net" and insert --next-- column 18, line 43 after "adaptability" insert --calculation--

Signed and Sealed this

Eighth Day of August, 2006

JON W. DUDAS
*Director of the United States Patent and Trademark Office*